United States Patent Office  3,631,117
Patented Dec. 28, 1971

3,631,117
HYDROISOMERIZATION OF CYCLIC COMPOUNDS WITH SELECTIVE ZEOLITE CATALYSTS
Stephen M. Kovach and Ronald A. Kmecak, Ashland, Ky., assignors to Ashland Oil & Refining Company, Houston, Tex.
No Drawing. Filed Dec. 19, 1968, Ser. No. 785,375
Int. Cl. C07c 3/00
U.S. Cl. 260—666                        10 Claims

ABSTRACT OF THE DISCLOSURE

Cyclic organic compounds, such as toluene, methylcyclohexane, hydronaphthalenes, etc., are hydroisomerized to produce isomeric products, such as dimethylcyclopentanes and alkyl indanes and hydrindanes, respectively, by contacting the cyclic compound with a catalyst of an active metal selected from the group consisting of a metal of Group VIII of the Periodic System, particularly platinum, palladium, rhodium, nickel or cobalt, molybdenum and rhenium, alone or in combination with one another, or in combination with other catalytic metals, such as tungsten, etc., deposited or exchanged on a zeolite base, such a calcium type Y zeolite, a hydrogen type Z (Mordenite) zeolite, etc., while maintaining conditions sufficient to cause rupture of at least one ring of the cyclic compound, as between 400 and 1000° F., 0 and 2000 p.s.i.g., 0.1 and 10 liquid hourly space velocity, and 1 and 20 to 1 moles hydrogen at aromatic feed.

BACKGROUND OF THE INVENTION

The present invention relates to a novel process for the hydroisomerization of cyclic organic compounds. In a more specific aspect, the present invention relates to a novel process for the hydroisomerization of saturated or unsaturated, mono- or polycyclic organic compounds in the presence of a novel catalyst system.

Substantially pure cyclic organic materials and mixtures thereof are readily available from refining processes, such as catalytic reforming. A highly aromatic reformate may be solvent extracted, as with glycol-water mixture, the aromatic extract distilled from the solvent and extremely high purity individual aromatics can be separated from one another by further distillation. On the other hand, there is no direct or convenient means for the production of alkyl cyclopetanes, indanes, hydrindanes, and the like. Obviously, if a suitable hydroisomerization reaction could be carried out, it would be a fairly easy matter to convert such aromatic as well as saturated mono- and polycyclic aromatics to the corresponding materials having fewer carbon atoms in at least one of the rings. These corresponding isomers, such as alkyl cyclopentanes, indanes and hydrindanes, have a wide variety of uses. For example, alkyl cyclopentanes can be hydrogenated to mono- and di-olefins Mono-olefinic cyclopentanes can be converted to many different petrochemicals through oxidation, halogenation, hydrohalogenation, hydration, etc., and alkyl cyclopentadienes can be utilized in the production of resins, polymers and polyhalogenated insecticides. Unfortunately, however, known catalyst systems for the isomerization or hydroisomerization of cyclic compounds produce low yields of cyclopentyl derivatives due to the low activity of the catalyst, hydrocracking predominating in the reaction, etc. Accordingly, the primary present source of alkyl cyclopentanes and the like is the separation of highly selective cuts from petroleum fractions and pyrolysis gasolines while the main source of indanes and indenes is from petroleum fractions and coal tar fractions.

It is therefore an object of the present invention to provide an improved process for hydroisomerization of cyclic organic compounds which overcomes all of the above mentioned difficulties. Another object of the present invention is to provide a process for the hydroisomerization of cyclic organic compounds utilizing a novel catalyst system. Still another object of the present invention is to provide an improved process for the hydroisomerization of cyclic organic compounds which produces high yields of isomeric products. Another and further object of the present invention is to provide an improved process for the hydroisomerization of cyclic organic compounds to isomers having a fewer number of carbon atoms in at least one of the rings. Yet another object of the present invention is to provide an improved process for the hydroisomerization of aromatics wherein saturated and unsaturated, mono- and polycyclic compounds are converted to corresponding saturated and partially saturated isomers. A still further object of the present invention is to provide an improved process for the hydroisomerization of cyclic compounds utilizing a catalyst of an active metal, adapted to hydrogenate ring carbon atoms, on a zeolite support. A further object of the present invention is to provide an improved process for the hydroisomerization of cyclic compounds utilizing a critical range of conditions. Another of the present invention is to provide an improved process for the hydroisomerization of cyclic compounds utilizing a critical temperature. Another and further object of the present invention is to provide an improved process for the hydroisomerization of cyclic compounds utilizing a novel catalyst system and a critical temperature. These and other objects and advantages of the present invention will be apparent from the following detailed description.

SUMMARY OF THE INVENTION

Briefly, in accordance with the present invention, cyclic organic compounds are hydroisomerized in the presence of an active metal having the ability to hydrogenate a ring carbon atom deposited or exchanged on a zeolite base. Yields of isomer products can be further improved by maintaining the reaction temperature between about 400 and 1000° F., and preferably between about 450 and 750° F.

DETAILED DESCRIPTION OF THE INVENTION

The term "hydroisomerization" as employed in accordance with the present invention is meant to include any isomerization reaction in which a saturated or unsaturated, mono- or polycyclic organic compound has at least one of its rings ruptured and a corresponding transfer of the split-off carbon atom or atoms about the remaining ring structures of the compound. In addition to the ring rupture and redistribution of carbon atoms, the reaction may, of course, include dehydrogenation and hydrogenation, as well as rupture of any attached alkyl group and their redistribution. However, this type of isomerization is to be clearly contrasted with and distinguished from the type of isomerization in which there is simply a transfer of alkyl groups about a ring structure, such as the conversion of one xylene to its isomers, a dehydrogenation reaction, such as the conversion of methylcyclohexane to toluene, or a hydrogenation for converting toluene to methylcyclohexane, or combinations of these three reactions.

The feed materials, in accordance with the present invention, may be any saturated or unsaturated mono- or polycyclic organic compound. Unsaturated or aromatic compounds suitable as feed materials in accordance with the present invention include toluene, tetrahydronaphthalene and the like, and the saturated cyclic compounds include methylcyclohexane, decahydronaphthalene, etc. By way of example, toluene or methylcyclohexane may be converted to dimethylcyclopentane while decahydronaphthalene or tetrahydronaphthalene may be converted to methylindane or methylhydrindane. Higher homologs of benzene, naphthalene, cyclohexane, and the like, may also be converted to corresponding cyclopentanes and indanes, etc.

The process of the present invention should be conducted at a temperature between about 400 and 1000° F., and preferably between about 450 and 750° F. As will appear from the examples set forth hereinafter, temperatures below or near the lower end of the indicated range result in excessive hydrogenation whereas temperatures at the upper end of the range and above result in substantial disproportionation and transalkylation (transfer of alkyl groups of one cyclic compound to another) and cracking. The remaining conditions should include a pressure of about 0 to 2000 p.s.i.g., and preferably 0 to 500 p.s.i.g., a liquid hourly space velocity between about 0.1 and 10, and preferably between 0.1 and 5, and a hydrogen-to-hydrocarbon mole ratio between about 1 and 20 to 1, and preferably between 1 and 10 to 1.

The catalyst of the present invention includes an active cyclic hydrogenation metal deposited on a zeolite base.

The zeolites are a class of hydrated silicates of aluminum and either sodium or calcium or both, having the general formula $(Ca, Na_2)O \cdot Al_2O_3 \cdot SiO_2 xH_2O$. Originally, the term zeolite described a group of naturally-occurring minerals which were principally sodium or calcium aluminosilicates. Such naturally-occurring zeolites include for example, chabazite, gmelinite, erionite, faujasite, analcite, heulandite, natrolite, stilbite, thomsonite, etc. Synthetic zeolites are generally known in the trade by a tradename or trade designation applied by the specific manufacturer. For example, types A, X, and Y are manufactured by Linde Company and synthetic mordenite is designated Zeolon or type Z by its manufacturer, the Norton Company. Zeolites generally have a rigid, three-dimensional anionic network with intracrystalline channels whose narrowest cross-section has essentially a uniform diameter. Thus, zeolites, of both natural and synthetic origin, can be distinguished from crystalline aluminosilicate clays, such as bentonite, which have a two-dimensional layer structure, and silica-alumina synthetic catalysts which are amorphous aluminosilicates having a random structure.

Zeolites whose atoms are arranged in a crystal lattice in such a way that there are a large number of small cavities innerconnected by smaller openings or pores of precisely uniform size are generally referred to as molecular sieves. Some natural zeolites exhibit molecular sieve characteristics to a limited degree. However, the synthetic zeolites as a class exhibit these characteristics.

A synthetic zeolite found particularly effective in the present process is a type Y molecular sieve manufactured by Linde Company. This material has the general formula $Na_{56+y}[(AlO_2)_{56+y}(SiO_2)_{136-y}]$ where $y$ has a value of about 0 and can vary from $-8$ to 20. The type Y zeolite crystallizes in the cubic system and the lattice constant for the sodium form, with a Si/Al ratio of 2.5, is 24.66 A. In the sodium form of Y, the negative charge in each $AlO_4$ is balanced by a closely associated sodium atom. In the divalent cationic form, however, the divalent cation, usually calcium or magnesium, is asymmetrically located with respect to the aluminas. The type Y used in the present invention is preferably in its Ca form.

Synthetic mordenite, designated Zeolon or type Z by the Norton Company, has a high silicon to aluminum ratio, generally about 5 to 1. The postulated formula for this material is $(Ca,Na_2)Al_2Si_9O_{22}5HO$. The basic unit is a tetrahedron consisting of one silicon or aluminum atom surrounded by 4 oxygens. The crystal is made up of 4 and 5-membered rings of these tetrahedra. The chains are linked together to form a network having a system of large parallel channels interconnected by small cross channels. This zeolite is preferably in its hydrogen form in the present invention.

The active metal of the catalyst of the present invention includes any metal capable of hydrogenating a carbon atom of a ring structure. It has been found in accordance with the present invention that suitable metals include a metal selected from the group consisting of a Group VIII metal, particularly ruthenium, rhodium, palladium and platinum of the noble metal group and nickel of the non-noble or ferrous group of Group VIII, of the Periodic System, molybdenum of Group VI–B of the Periodic System, and rhenium of Group VII–B of the Periodic System alone or in combination with each other, such as nickel-molybdenum, cobalt-molybdenum, etc., or in combination with other catalytic metals which enhance such ring hydrogenation, such as tungsten, etc. The active ring hydrogenation metal is present in a concentration between about 0.1 and 10% by weight of the finished catalyst. The addition of the active catalyst hydrogenation metal can be accomplished by impregnation or exchange techniques well known in the art. Such metal exchanges may be carried out by a single or multiple-stage procedure.

The following tables illustrate the present invention.

TABLE I

| Run | 1 | 2 | 3 | 4 | 5 | 6 | 7 | 8 | 9 | 10 |
|---|---|---|---|---|---|---|---|---|---|---|
| Catalyst | Pt on calcium exchanged type Y Zeolite | | | | | | | | | |
| Feed | Toluene, commercial grade, 98.5%+ | | | | | | | | | |
| Conditions: | | | | | | | | | | |
| Temp., °F.: | | | | | | | | | | |
|   Peak | 518 | 542 | 540 | 586 | 639 | 569 | 608 | 803 | 956 | 956 |
|   Average | 448 | 479 | 502 | 528 | 609 | 525 | 571 | 795 | 947 | 947 |
| Pressure, p.s.i.g | 100 | 100 | 100 | 100 | 100 | 200 | 200 | 200 | 200 | 400 |
| H2/H'C (mole), approx | 2 | 3 | 3 | 4 | 4 | 4 | 4 | 3 | 3 | 1 |
| L.H.S.V | 0.34 | 0.29 | 0.21 | 0.23 | 0.22 | 0.25 | 0.26 | 0.26 | 0.32 | 0.30 |
| Liq. prod. dist. wt. percent: | | | | | | | | | | |
|   Cracked product | Trace | Trace | Trace | Trace | 1.0 | 0.3 | 1.5 | 3.3 | 4.0 | 5.7 |
|   Dimethyl cyclic ·C5's | 0.5 | 10.0 | 24.8 | 25.3 | 30.9 | 33.8 | 42.7 | 10.5 | Trace | Trace |
|   Methylcyclohexane | 98.9 | 89.4 | 74.5 | 74.0 | 61.8 | 65.7 | 55.6 | 3.8 | Trace | Trace |
|   Benzene | 0.3 | Trace | Trace | Trace | 0.5 | Trace | Trace | 3.3 | 29.6 | 37.8 |
|   Toluene | 0.2 | Trace | Trace | Trace | 5.7 | Trace | Trace | 63.6 | 49.8 | 45.6 |
|   Xylene | | | | | Trace | | | 15.5 | 16.4 | 12.9 |
| Conversion, wt. percent liq. prod | 99.8 | >99 | >99 | >99 | 94.3 | >99 | >99 | 36.4 | 50.2 | 54.4 |
| Liq. prod. recovery [1], vol. percent | 107 | 108 | 104 | 118 | 107 | 106 | 113 | 94 | 70 | 79 |

[1] Recoveries exceeding 100 vol. percent involve density change from feed to product, i.e. toluene converted to methylcyclohexane, theoretical volume change to 113%.

TABLE II

| Run | 11 | 12 | 13 | 14 |
|---|---|---|---|---|
| Catalyst | Pt/CaY | | | |
| Feed | Methylcyclohexane | | | |
| Conditions: | | | | |
| Temp., °F.: | | | | |
|   Peak | 534 | 590 | 943 | 956 |
|   Average | 514 | 555 | 934 | 947 |
| Pressure, p.s.i.g | 200 | 200 | 200 | 400 |
| H2/H'C (mole), approx | 2 | 2 | 1 | 1 |
| L.H.S.V | 0.27 | 0.26 | 0.33 | 0.33 |
| Liq. prod. wt. percent: | | | | |
|   Cracked products | 0.3 | 1.4 | 4.4 | Trace |
|   Dimethyl cyclic ·C5's | 30.9 | 45.2 | 8.3 | 20.6 |
|   Methylcyclohexane | 68.8 | 53.3 | 2.9 | 0.9 |
|   Benzene | | | 12.3 | 29.1 |
|   Toluene | | | 55.2 | 41.2 |
|   Xylene | | | 17.0 | 8.0 |
| Conversion, wt. percent liq. prod | 31.2 | 46.6 | 97.1 | 99.1 |
| Liq. prod. recovery,[1] vol. percent | 106 | 100 | 82 | 78 |

[1] Recoveries exceeding 100 vol. percent involve density change from feed to product, i.e. toluene converted to methylcyclohexane, theoretical volume change to 113%.

TABLE III

| Run | 15 | 16 |
|---|---|---|
| Catalyst | Pt/CaY | |
| Feed | Decalin | |
| Conditions: | | |
| Temp., °F.: | | |
| Peak | 949 | 698 |
| Average | 943 | 678 |
| Pressure, p.s.i.g | 200 | 400 |
| H₂/H'C (mole), approx | 1 | 1 |
| L.H.S.V | 0.32 | 0.28 |
| Liq. prod. dist., wt. percent: | | |
| <Benzene (sat.) | 7.8 | 1.9 |
| Aromatics | 18.1 | Trace |
| Hydrindane structure | 6.9 | 10.9 |
| Decalin | 19.9 | 67.7 |
| Indane structure | 24.8 | 6.7 |
| Tetralin | Trace | 12.6 |
| Naphthalene+ | 22.1 | Trace |
| Conversion, wt. percent liq. prod | 80.1 | 32.3 |
| Liq. prod. recovery, vol. percent | 92 | 99 |

When reference is made herein to the Periodic System of Elements, the particular groupings referred to are as set forth in the Periodic Chart of the Elements in "The Merck Index," Seventh edition, Merck & Co., Inc., 1960.

We claim:

1. A process for the hydroisomerization of unsubstituted and alkyl-substituted mono- and polycyclic hydrocarbons having 6 carbon atoms in their ring structures to produce corresponding cyclic hydrocarbons having one less carbon atom in at least one ring, comprising, contacting said hydrocarbons with a catalyst comprising from 0.1 to 10% by weight of a metal selected from the group consisting of Group VIII of the Periodic System, and mixtures thereof on a type Y zeolite under conditions sufficient to cause rupture of at least one ring of said hydrocarbon and consequent rearrangement of the atoms thereof within the same molecule, including, a temperature of about 450–750° F., a pressure of about 0 to 500 p.s.i.g., a liquid hourly space velocity of about 0.1 to 5, and a hydrogen-to-hydrocarbon mole ratio between about 1 and 10 to 1.

2. A process in accordance with claim 1 wherein the type Y zeolite is in its calcium form.

3. A process in accordance with claim 1 wherein the hydrocarbon compound is toluene and said toluene is converted to dimethyl cyclopentane.

4. A process in accordance with claim 1 wherein the hydrocarbon compound is methylcyclohexane and said methylcyclohexane is converted to dimethylcyclopentane.

5. A process in accordance with claim 1 wherein the hydrocarbon compound is decahydronaphthalene and said decahydronaphthalene is converted to methylindane.

6. A process in accordance with claim 1 wherein the hydrocarbon compound is tetrahydronaphthalene and said tetrahydronaphthalene is converted to methylhydrindane.

7. A process in accordance with claim 3 wherein the catalyst is platinum exchanged on a calcium form of a type Y zeolite.

8. A process in accordance with claim 4 wherein the catalyst is platinum exchanged on a calcium form of a type Y zeolite.

9. A process in accordance with claim 5 wherein the catalyst is platinum exchanged on a calcium form of a type Y zeolite.

10. A process in accordance with claim 6 wherein the catalyst is platinum exchanged on a calcium form of a type Y zeolite.

References Cited

UNITED STATES PATENTS

| | | | |
|---|---|---|---|
| 3,236,761 | 2/1966 | Rabo et al. | 208—46 MS |
| 3,427,243 | 2/1969 | Hass et al. | 208—46 MS |
| 3,146,279 | 8/1964 | Gallagher | 208—46 MS |
| 3,409,686 | 11/1968 | Mitsche | 208—46 MS |
| 3,190,939 | 6/1965 | Beuesi | 208—46 MS |
| 2,971,904 | 2/1961 | Gladrow | 208—46 MS |
| 3,114,695 | 12/1963 | Rabo et al. | 208—46 MS |
| 3,140,322 | 7/1964 | Frillette | 208—46 MS |
| 3,200,083 | 8/1965 | Milton | 208—46 MS |
| 2,971,903 | 2/1961 | Kimberlin | 208—46 MS |

FOREIGN PATENTS

| | | | |
|---|---|---|---|
| 1,088,933 | 10/1967 | Great Britain | 208—46 MS |

DELBERT E. GANTZ, Primary Examiner

V. O'KEEFE, Assistant Examiner